US010215988B2

(12) United States Patent
Parker et al.

(10) Patent No.: US 10,215,988 B2
(45) Date of Patent: Feb. 26, 2019

(54) INTEGRATED MICROOPTIC IMAGER, PROCESSOR, AND DISPLAY

(71) Applicants: William P. Parker, Waitsfield, VT (US); Michael A. Strauss, Raleigh, NC (US); Ian M. Rousseau, South Hero, VT (US); Eric M. Gallo, Duxbury, VT (US)

(72) Inventors: William P. Parker, Waitsfield, VT (US); Michael A. Strauss, Raleigh, NC (US); Ian M. Rousseau, South Hero, VT (US); Eric M. Gallo, Duxbury, VT (US)

(73) Assignee: Marsupial Holdings, Inc., Waitsfield, VT (US)

(*) Notice: Subject to any disclaimer, the term of this patent is extended or adjusted under 35 U.S.C. 154(b) by 0 days.

(21) Appl. No.: 16/119,833

(22) Filed: Aug. 31, 2018

(65) Prior Publication Data

US 2019/0033601 A1    Jan. 31, 2019

Related U.S. Application Data

(63) Continuation of application No. 15/185,437, filed on Jun. 17, 2016, now Pat. No. 10,067,348, which is a
(Continued)

(51) Int. Cl.
*G09G 5/00* (2006.01)
*G02B 27/01* (2006.01)
(Continued)

(52) U.S. Cl.
CPC ......... *G02B 27/0172* (2013.01); *G02B 3/005* (2013.01); *G02B 3/0056* (2013.01);
(Continued)

(58) Field of Classification Search
CPC ............................ G02B 27/0172; G02B 3/005
(Continued)

(56) References Cited

U.S. PATENT DOCUMENTS

2008/0157235 A1* 7/2008 Rogers ............... H01L 21/8258
                                                                    257/415
2012/0212406 A1    8/2012 Osterhout et al.
(Continued)

FOREIGN PATENT DOCUMENTS

WO    2007058409 A1    5/2007

OTHER PUBLICATIONS

Gil Zamorano, "Communication pursuant to Article 94(3) EPC", related to European Application No. 14827938.3, dated Sep. 12, 2018.

*Primary Examiner* — Calvin C Ma
(74) *Attorney, Agent, or Firm* — Justin W. McCabe; Dunkiel Saunders Elliott Raubvogel Hand, PLLC

(57) ABSTRACT

An optical system for displaying light from a scene includes an active optical component that includes a first plurality of light directing apertures, an optical detector, a processor, a display, and a second plurality of light directing apertures. The first plurality of light directing apertures is positioned to provide an optical input to the optical detector. The optical detector is positioned to receive the optical input and convert the optical input to an electrical signal corresponding to intensity and location data. The processor is connected to receive the data from the optical detector and process the data for the display. The second plurality of light directing apertures is positioned to provide an optical output from the display.

20 Claims, 8 Drawing Sheets

Related U.S. Application Data continuation of application No. PCT/US2014/070991, filed on Dec. 17, 2014.

(60) Provisional application No. 61/963,928, filed on Dec. 17, 2013.

(51) Int. Cl.
*G06T 11/60* (2006.01)
*H04N 5/33* (2006.01)
*H04N 13/232* (2018.01)
*H04N 13/307* (2018.01)
*G02B 3/00* (2006.01)

(52) U.S. Cl.
CPC ....... *G02B 3/0068* (2013.01); *G02B 27/0101* (2013.01); *G02B 27/017* (2013.01); *G06T 11/60* (2013.01); *H04N 5/332* (2013.01); *H04N 13/232* (2018.05); *H04N 13/307* (2018.05); *G02B 2027/0174* (2013.01); *G02B 2027/0178* (2013.01)

(58) Field of Classification Search
USPC .............................................. 345/1.1, 8, 618
See application file for complete search history.

(56) References Cited

U.S. PATENT DOCUMENTS

2013/0021226 A1    1/2013  Bell
2016/0164261 A1*  6/2016  Warren ................ H04N 5/2354
                                               348/164

* cited by examiner 30a  32    34    36    30b

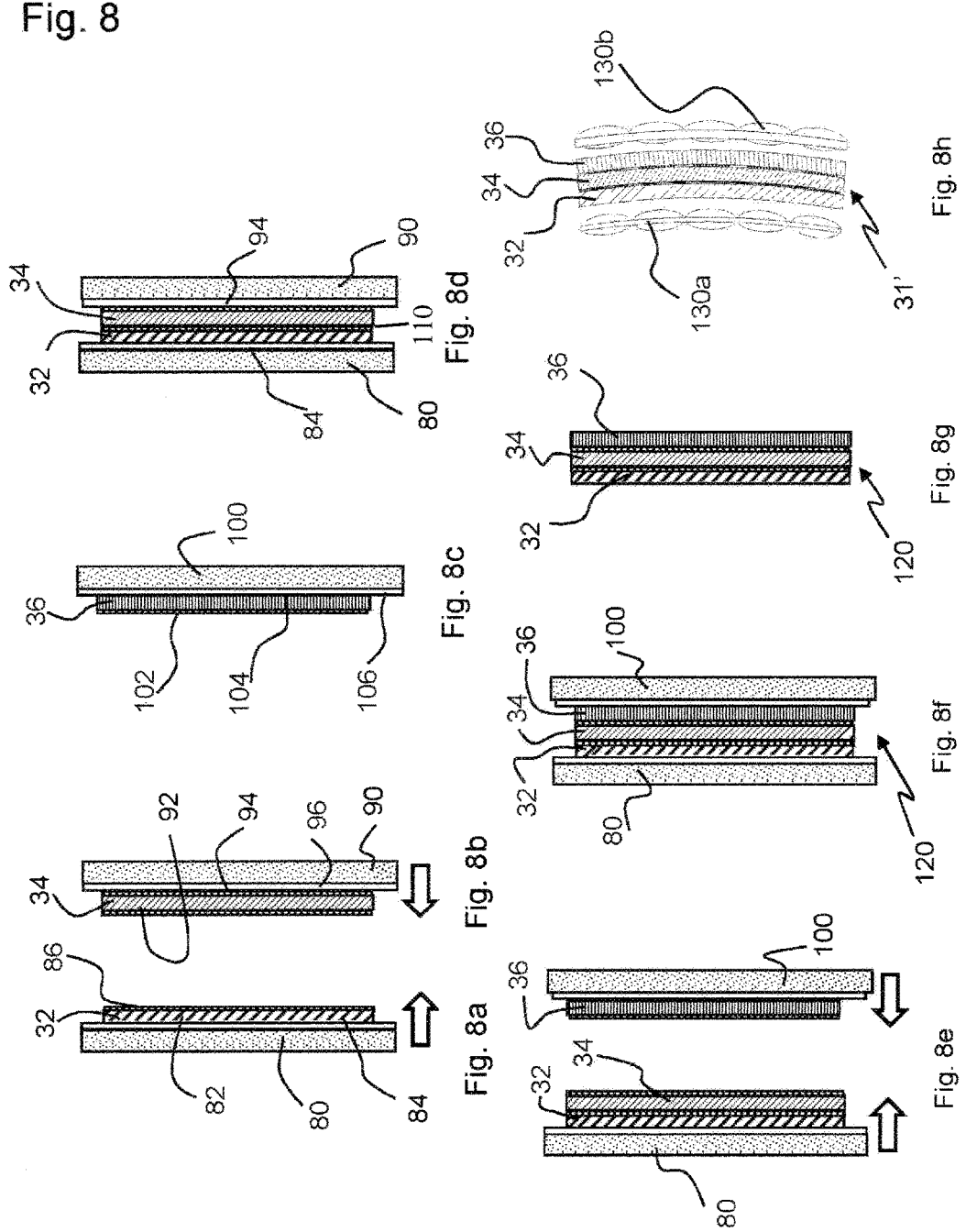

INTEGRATED MICROOPTIC IMAGER, PROCESSOR, AND DISPLAY

PRIORITY

This application is a continuation of U.S. patent application Ser. No. 15/185,437 filed on Jun. 17, 2016, and titled "Integrated Microoptic Imager, Processor, and Display", which is a continuation of PCT Application No. PCT/US2014/070991 filed on Dec. 17, 2014 and titled "Integrated Microoptic Imager, Processor, and Display", which claims priority to U.S. Provisional Application No. 61/963,928, filed Dec. 17, 2013, "Integrated MicroOptic Imager, Processor, and Display," each of which are incorporated herein by reference in their entireties.

FIELD

This patent application generally relates to a structure for imaging a scene. More particularly, it relates to a stack structure. Even more particularly it relates to a compact stack structure.

BACKGROUND

Imaging devices have required significant space either for optical input or for optical display or both. Applicants recognized that better schemes than those available are needed and such solutions are provided by the following description.

SUMMARY

One aspect of the present patent application is an optical system for displaying light from a scene. The optical system includes an active optical component that includes a first plurality of light directing apertures, an optical detector, a processor, a display, and a second plurality of light directing apertures. The first plurality of light directing apertures is positioned to provide an optical input to the optical detector. The optical detector is positioned to receive the optical input and convert the optical input to an electrical signal corresponding to intensity and location data. The processor is connected to receive the data from the optical detector and process the data for the display. The second plurality of light directing apertures is positioned to provide an optical output from the display.

BRIEF DESCRIPTION OF THE DRAWINGS

The foregoing will be apparent from the following detailed description, as illustrated in the accompanying drawings, in which:

FIG. 3b is a top view of the detector, processor, and display of FIG. 3a;

FIGS. 8a, 8b, 8c, 8d, 8e, 8f, 8g, and 8h are process steps to fabricate a curved active optical component of the present patent application.

DETAILED DESCRIPTION

Figure 1:
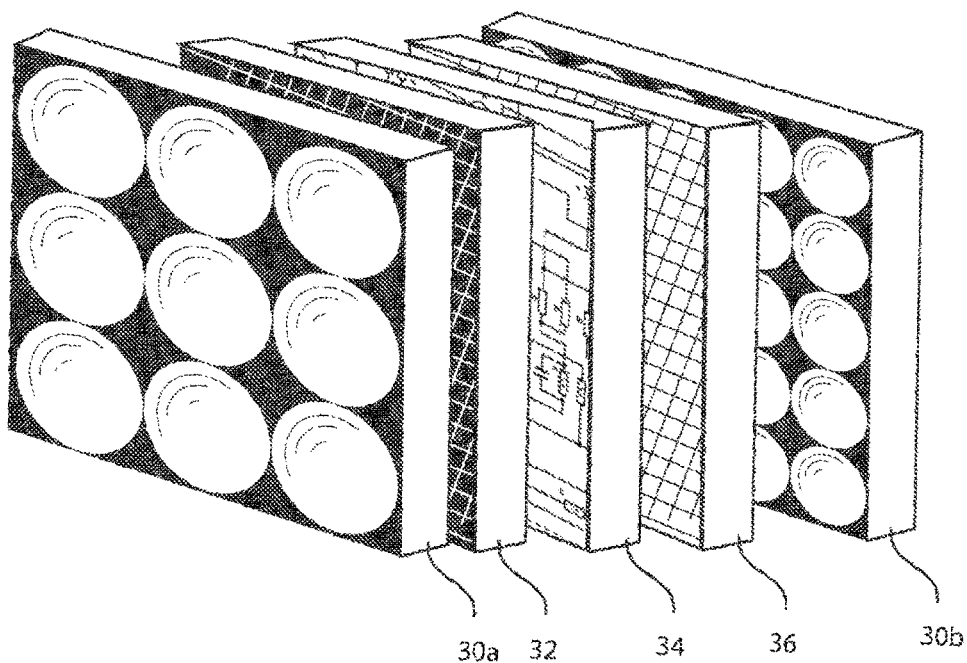
FIG. 1 is an exploded three dimensional view of one embodiment of the active optical component of the present patent application.
Figure 2:
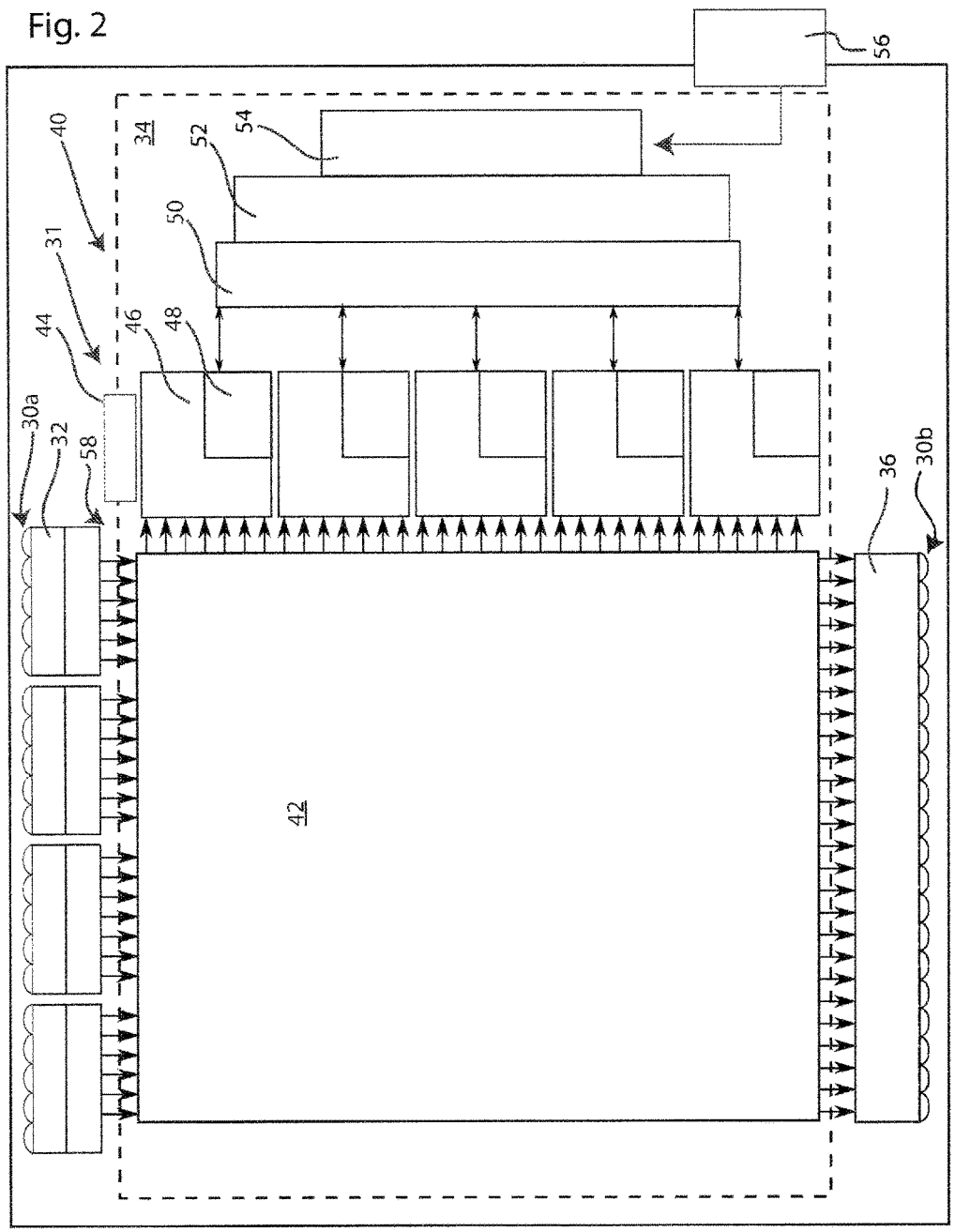
FIG. 2 is a block diagram of the embodiment of the active optical component of FIG. 1.

In one embodiment, the system uses light directing apertures, such as micro-lens arrays 30a, 30b for both the input and output optical elements and uses stacked component 31 including optical detector 32, processor 34, and display 36 located between the two light directing apertures 30a, 30b, to provide active optical component 40, as shown in FIG. 1 and in the block diagram in FIG. 2.

Light directing apertures arc fabricated of a material such as molded glass, fused silica, acrylic plastic, polycarbonate, Uvex, CR39, and Trivex.

Optical detector 32 includes an array of receptors that receive photons from the scene outside through light directing apertures 30a and converts the photons to electrical signals corresponding to intensity and location in the scene outside. Optical detector 32 can include a charge coupled device, a complementary metal-oxide semiconductor sensor chip, and such low light detectors as a microchannel amplifier imaging chip combination and an electron bombarded integrated circuit (EBIC), and for short wave infrared at low light level, an InGaAs focal plane array.

In one embodiment optical detector 32 has serial electrical connections for storing image data in memory 42 of processor 34. In another embodiment, optical detector 32 has multiple parallel connections 58 for storing this image data in memory 42 of processor 34.

Processor 34 also includes input assembler 44, arithmetic logic units 46 with data caches 48, execution manager 50, central processing unit 52, and local cache 54 that digitally process the image data from detector 32 and formats the data for display 36, providing an output through either a wire connector or multiple connectors 56 to display 36. The images provided on display 36 are seen by the eye of the viewer through optical output light directing apertures 30b.

Figure 3A:
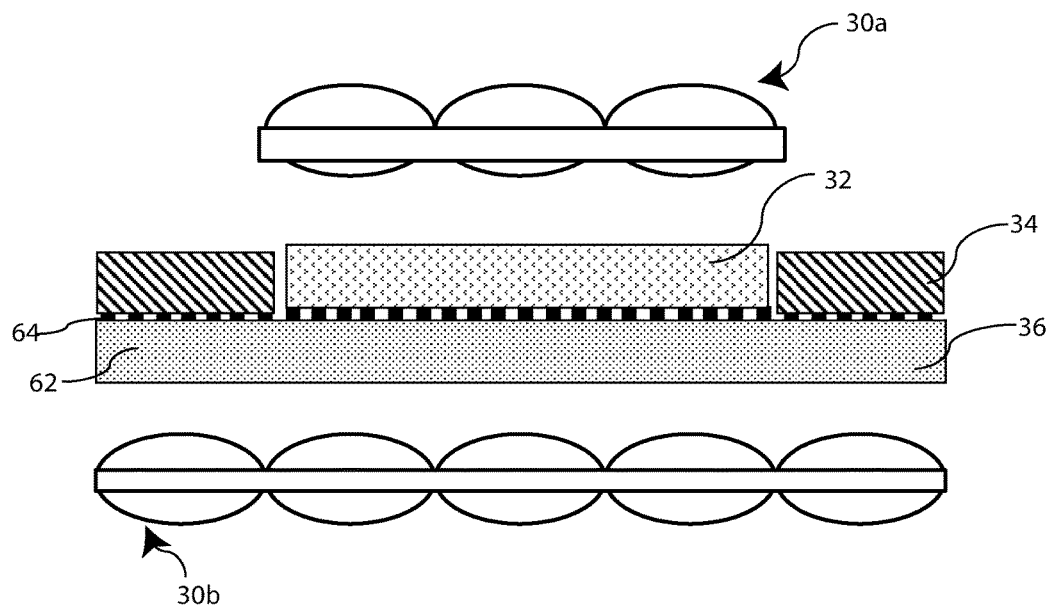
FIG. 3a is a cross sectional view of another embodiment of the active optical component of the present patent application in which detector, processor, and display connect on a common surface.
Figure 3B:
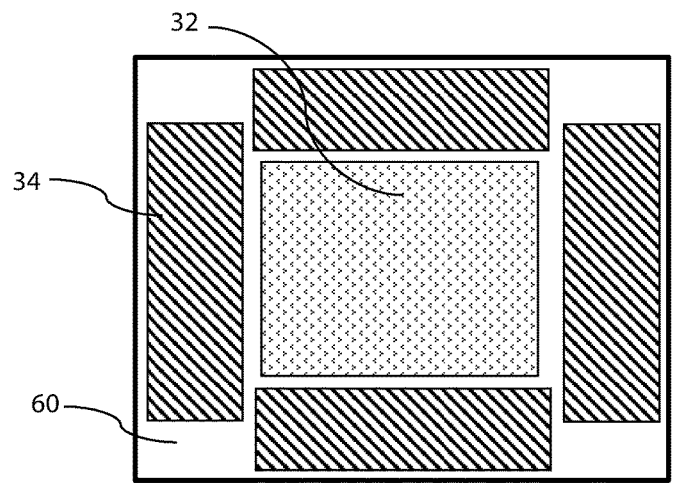

In one embodiment, optical detector 32, processor 34, and display 36 share a common interconnect surface, which is back surface 60 of display 36, as shown in FIGS. 3a, 3b. Detector 32 and processor 34 are interconnected with each other and with display 36 through connectors 62, 64 and surface wiring (not shown) on back surface 60.

Figure 4:
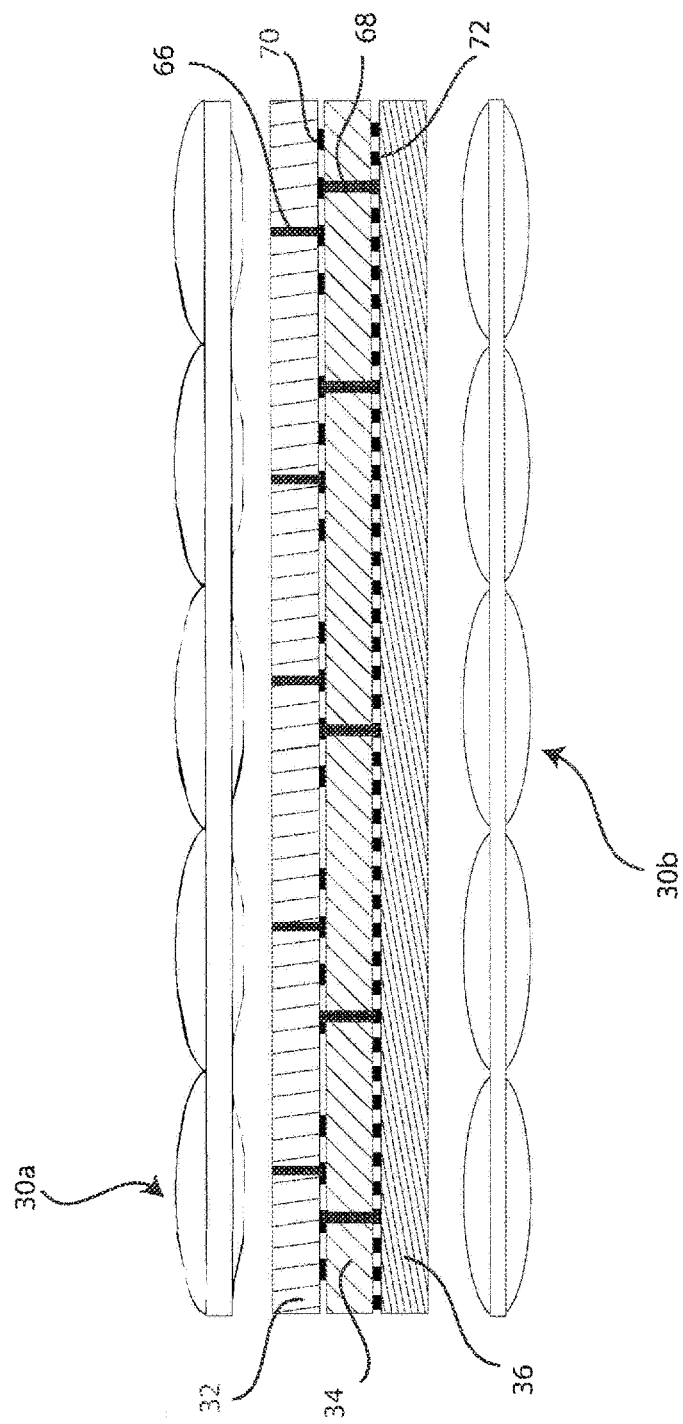
FIG. 4 is a cross sectional view of the embodiment of the active optical component of FIG. 1 in which detector, processor, and display are all in separate layers.

In another alternative, detector 32, processor 34 and display 36 are on separate layers, as shown in FIG. 4. In this embodiment detector 32 and processor 34 have through chip connections 66, 68 to layer to layer interconnectors 70, 72.

In one embodiment, processor 34 has a first side and a second side, and the first side is electrically connected to optical detector 32 and the second side is electrically connected to display 36. Alternatively, standard cable connectors (not shown) are used for the connections from detector 32 to processor 34 and from processor 34 to display 36.

In one experiment an assembly of input side optics was built and tested with light directing apertures 30a that were micro-lenses that each had a focal length f=9.3 mm and with 3.2 mm apertures in a 3×3 array. The field of view was 20°, the display resolution was 2048 pixels×2048 pixels, and each pixel was 5.5×5.5 microns on a side with an optical resolution of 55 line pairs per degree (lp/°) Each lens of the micro-lens array was a compound lens. Total thickness of the input optics micro lens array was 8.5 mm and the spacing to detector 32 was 1 mm. The lens array was custom diamond turned in Zeonex plastic.

In one experiment an assembly of output side optics was purchased and tested. The resolution was 2 line pairs/degree. The field of view was 17 degrees. The focal length was 3.3 mm. The aperture was 1mm diameter. Each lens was 3 mm thick molded polycarbonate. The micro lenses were purchased from Fresnel Technologies, Fort Worth, Tex. and were part number 630. The display was a 15×11 mm Sony OLED micro-display, part number ECX322A.

As in the experiment, light directing apertures 30a can have different dimensions than light directing apertures 30b.

Figure 5A:
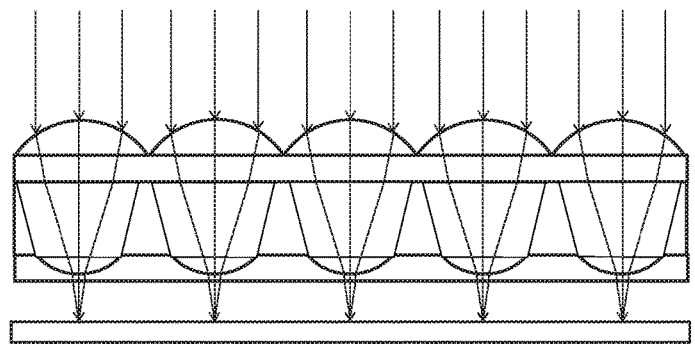
FIG. 5a is a cross sectional view showing the input light directing apertures as a micro-lens array.
Figure 5B:
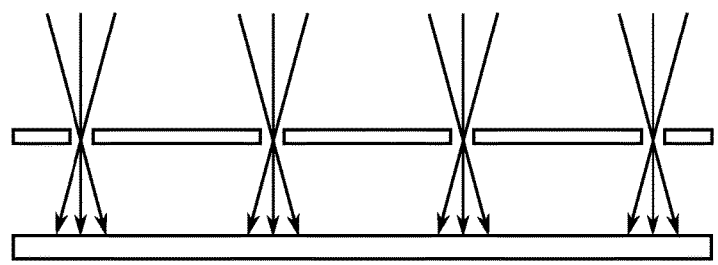
FIG. 5b is a cross sectional view showing the input light directing apertures as an array of pinholes.
Figure 5C:
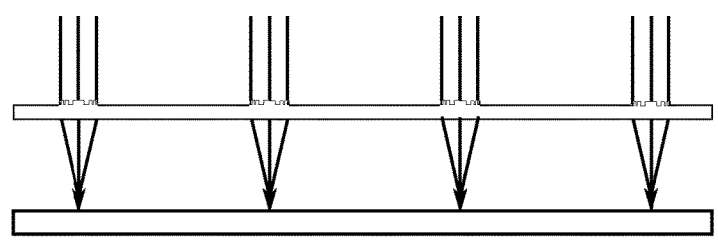
FIG. 5c is a cross sectional view showing the input light directing apertures as an array of diffraction gratings.

While light directing apertures 30a, 30b are illustrated as micro-lenses, as shown in FIGS. 1, 2, and 5a, light directing apertures can be pinholes, as shown in FIG. 5b, and diffraction gratings, as shown in FIG. 5c. Zone plates, holograms, gradient index material, and photonics crystals can also be used. Each lens of a micro-lens array can be compound lens, as shown in FIG. 5a.

In one embodiment, adjacent ones of the light directing apertures are configured to provide redundant scene elements on detector 32. Processor 34 includes a program to superimpose data from redundant scene elements, such as data derived from adjacent ones of the plurality of light directing optical apertures, to create a single image with such changes as higher resolution, better signal to noise ratio, and higher contrast, as described in a paper, "Thin observation module by bound optics (TOMBO): concept and experimental verification," by Jun Tanida et al, Applied Optics, Vol. 40, No. 11, 10 Apr. 2001 ("the Tanida paper"), in a paper, "PiCam: An Ultra-Thin High Performance Monolithic Camera Array," by Venkatarama et al, ACM Transactions on Graphics, Proceedings of ACM SIGGRATH Asia, 32 (5) 2013, both of which are incorporated herein by reference and as described in U.S. Pat. Nos. 5,754,348 and 8,013,914, both of which are incorporated herein by reference. Processor 34 can also include a program to provide a higher magnification.

Figure 6:
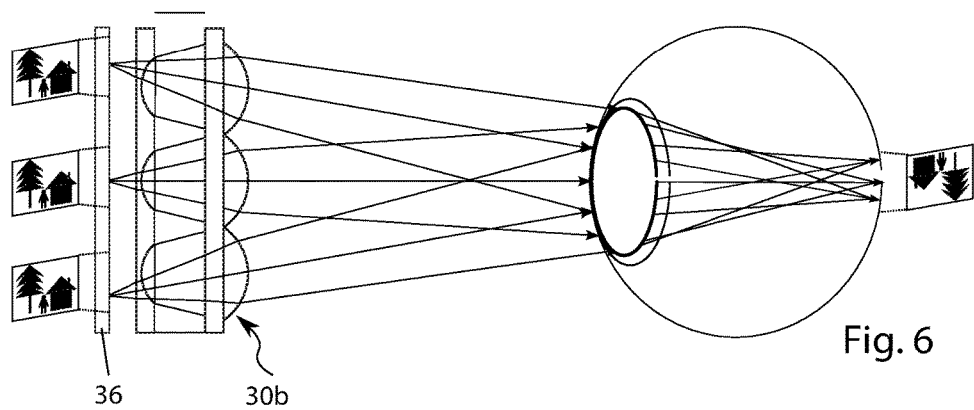
FIG. 6 is a cross sectional view showing the output light directing apertures directing light to form a single image on the retina of a nearby eye.

Detail of display 36 and output portion 30b located close to a user's eye is shown in FIG. 6. Display 36 provides a two dimensional array of similar images of the scene presented to input optics. The user sees display 36 through output apertures 30b. Wherever the user's eye is located the output apertures 30b each direct a portion of their respective subimage so that a single image is formed on the retina from a combination of contributions from each lens, as described in the US20140168783 patent application, incorporated herein by reference and in a paper, "Near-Eye Light Field Displays," by Douglas Lanman and David Luebke, ACM Transactions on Graphics, Proceedings of ACM SIGGRATH Asia, 32 (6) November 2013, article number 220.

This scheme allows display 36 and output portion 30b to be located close to the user's eye, such as on a pair of glasses.

In one embodiment, an external electronic device is connected to processor 34 through connector 56 for providing information on display 36. The external electronic device may be a communications system, a wifi, a GPS, a remote camera, another wearable optical system, a microphone, a digital compass, an accelerometer, a vehicle instrument, and an external computer. In one embodiment, the external information is provided on the display to overlay information from the scene, as described in U.S. Pat. No. 7,250,983, incorporated herein by reference. The system can thus augment what the viewer is seeing with overlaid information, for example, information about the subject or object being viewed. The overlaid information can be data that was previously stored.

In one embodiment, the system augments a user's vision by displaying images captured in wavelength bands including visible (0.4 to 0.7 microns), near infrared (0.7 to 1.0 microns), and short wave infrared (1.0 to 2.5 microns). With appropriate detectors, the system can also display images showing combinations, such as visible and near infrared, visible and short wave infrared, near infrared and short wave infrared, and visible, near infrared and short wave infrared. With appropriate detectors the system can also display images from objects providing light in other bands, including ultraviolet (0.2 to 0.4 micron), mid-wave infrared (2.5 to 6 micron), and long-wave infrared (6 to 14 micron). The system can thus augment user's vision by displaying images of the subject or object in a non-visible wavelength band. Well known detectors in the various wavelength bands can be used, as described in "Infrared Detectors: an overview," by Antoni Rogalski, in Infrared Physics & Technology 43 (2002) 187-210.

The present applicants found that with the multi-aperture array there is no change in the solid angle subtended as compared with using a single input lens. Nor is there a change in the flux of light collected by each pixel of the detector as compared with using a single input lens. They found that noise reduction was accomplished and resolution improved by using weighted averages of surrounding pixels as described in the Tanida paper.

Figure 7A:
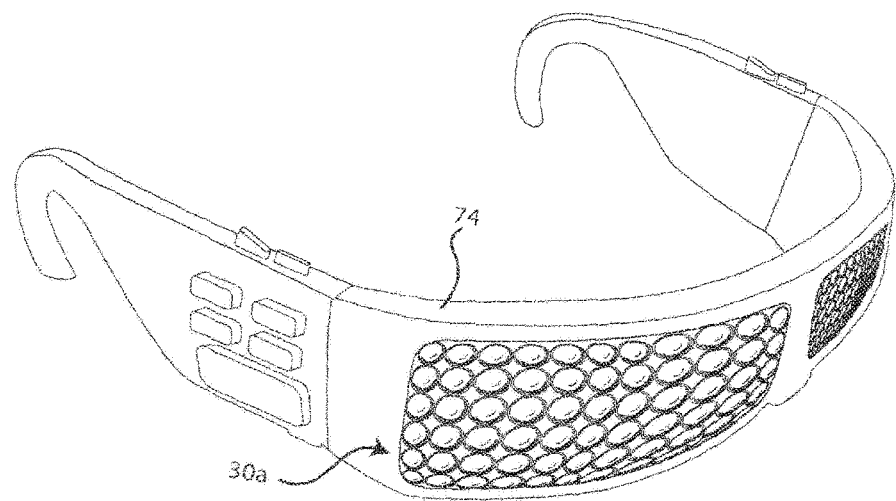
FIGS. 7a and 7b are three dimensional views showing a curved active optical component of the present patent application included in a pair of glasses.
Figure 7B:
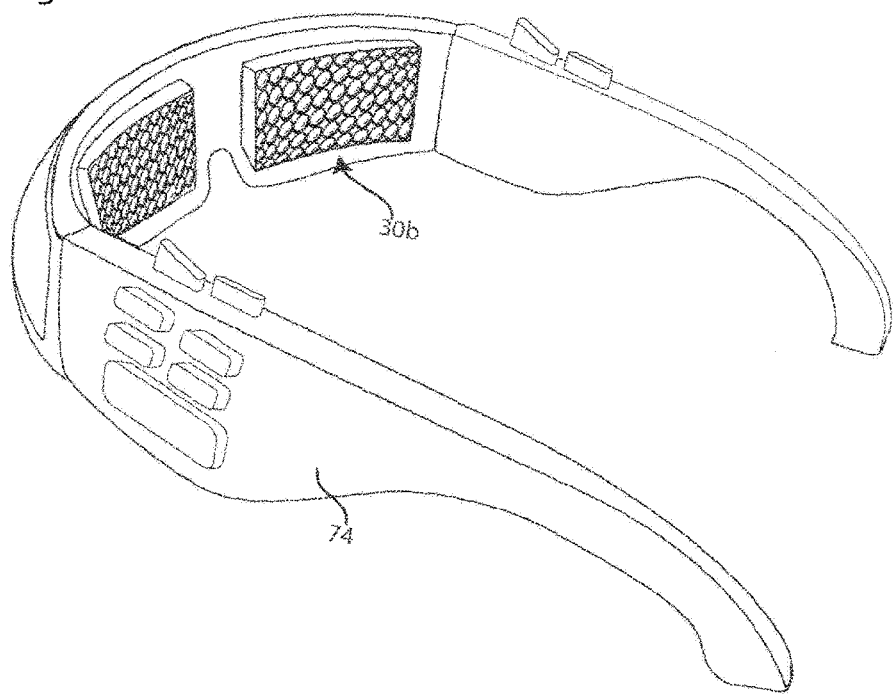
Figure 7C:
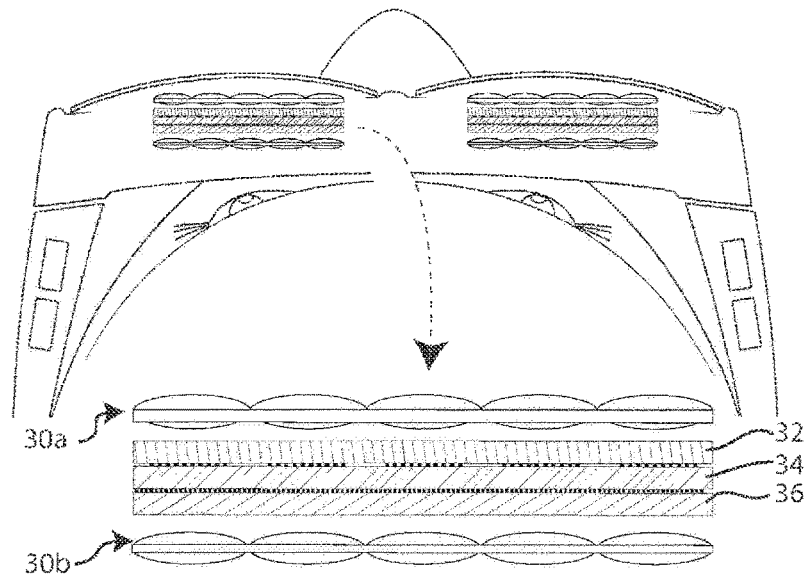
FIG. 7c is a three dimensional view showing a planar active optical component of the present patent application included in a pair of glasses.
Figure 7D:
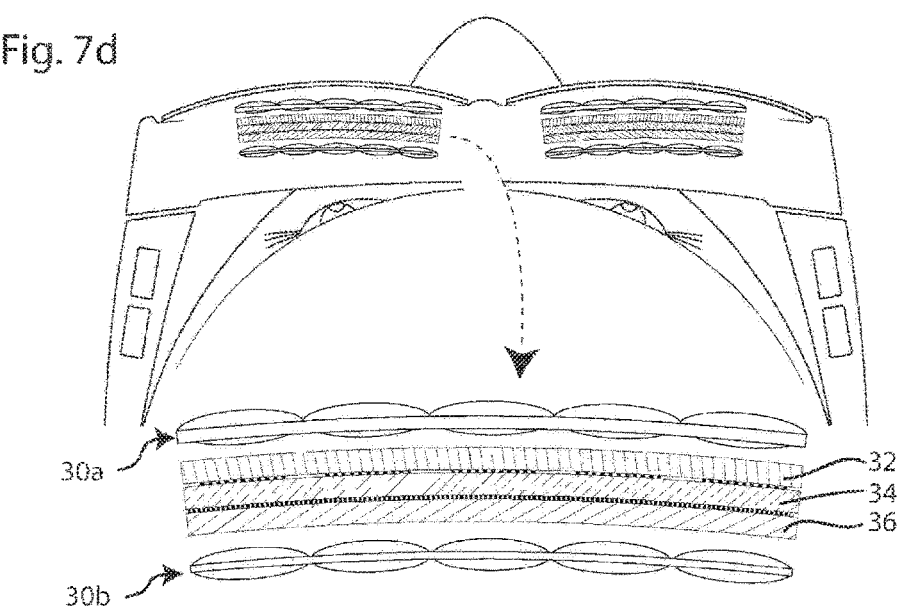
FIG. 7d is a three dimensional views showing a curved active optical component of the present patent application included in a pair of glasses.

The thickness of active optical component 40 is sufficiently reduced in this embodiment compared to previously existing devices, while the output light directing aperture 30b allows the system to be located near the user's eye, so a pair of active optical components 40 can be mounted to replace the ordinary lenses in a pair of glasses 74, as shown in FIGS. 7a-7d. In one alternative, glasses with the active optical components 40 can be worn over an ordinary pair of glasses. In another alternative, the glasses may have only one of the ordinary lenses so replaced, allowing normal vision with one eye. Light directing apertures 30a, 30b and stacked component 31 may be planar as shown in FIG. 7c or they may be curved as shown in FIGS. 7a-7b and 7d.

Curved semiconductor components are described in U.S. Pat. Nos. 6,027,958, 6,953,735, and 8,764,255 and US patent application 21040004644, all of which are incorporated herein by reference. Curved stacked components may include thinned crystalline silicon for detector and processor. Thinned silicon will roll up. It is sufficiently flexible that it can have different curvature in each of two dimensions. Other semiconductors are similarly flexible when thinned. Thinning is also advantageous for through silicon contacts. Display 36 is fabricated on a flexible substrate. Arrays of light directing apertures 30a, 30b, can also be fabricated with curves.

A process to fabricate curved stacked component 31' is shown in FIGS. 8a-8f. Detector 32 is grown epitaxially on the sacrificial oxide insulator surface of silicon-on insulator substrate 80, as shown in FIG. 8a, with active side 82 of detector 32 facing oxide insulator 84 and its back surface 86 with electrical contacts exposed. As grown, detector 32 is in the range from 2 to 20 microns thick.

Processor 34 is grown epitaxially on the sacrificial oxide insulator surface of silicon-on-insulator substrate 90, as shown in FIG. 8b, with active surface 92 and its electrical connections to detector 32 exposed and with its electrical contacts 94 for contact to the display facing oxide insulator 96. As grown, processor 34 is in the range from 2 to 20 microns thick.

Display 36 is grown epitaxially on the sacrificial oxide insulator surface of silicon-on-insulator substrate 100, as shown in FIG. 8c, with its electrical connections to the processor 102 exposed and with its display elements facing oxide insulator 106. As grown, display 36 is in the range from 10 to 30 microns thick. In one embodiment the display base material layer is silicon. Display elements may include metalization, deposited light emitting diodes, mirrors, and dielectric materials.

In the next step electrical contacts between detector wafer 32 and processor wafer 34 are aligned, as shown in FIG. 8d, and detector wafer 32 is bonded to processor wafer 34 using a standard contact to contact bonding method such as solder bonding or compression bonding.

In the next step detector-processor stack 110 is released from processor substrate wafer 90 using a process such as hydrofluoric acid or zenon difluoride, as shown in FIG. 8e.

In the next step the now exposed electrical connections of processor 34 are aligned and bonded to display 36 electrical contacts using a process such as solder bonding or compression bonding, as shown in FIG. 8f.

In the next step detector-processor-display stack 120 is released from both display substrate wafer 100 and from detector substrate wafer 80, as shown in FIG. 8g. The detector-processor-display stack is now flexible and has its electrical contacts aligned for electrical communication between layers. In addition, an electrical lead brought out to the edge of stack 120 or on the outside surface of either detector 32 or display 36 is used for connection to bring in power from a battery and signal from an external electronic device. Through connectors allow power brought in to one to be distributed to all three layers. The battery can be mounted elsewhere, such as in the glasses frame.

In the next step the detector-processor-display stack is aligned with and connected with rigid input curved lens array 130a and output curved lens array 130b fabricated as molded optics, conforming to their curvature, as shown in FIG. 8h, to provide curved stack 31'.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A process for the manufacture of a stacked optical component suitable for combination with a plurality of rigid curved lens arrays, the process comprising:

growing epitaxially a detector onto a first insulator substrate;

growing epitaxially a processor onto a second insulator substrate;

growing epitaxially a display onto a third insulator substrate;

bonding the detector to the processor to form a first stack;

releasing the first stack from the second insulator substrate;

bonding the first stack to the display to form a second stack; and releasing the second stack from the first insulator substrate and the second insulator substrate.

2. The process of claim 1, wherein the detector is grown so as to be from about 2 to about 20 microns thick.

3. The process of claim 1, wherein the detector has an active side and a back surface and wherein the active side is adjacent to first insulator substrate.

4. The process of claim 3, wherein the back surface includes exposed electrical contacts.

5. The process of claim 1, wherein the processor is grown so as to be from about 2 to about 20 microns thick.

6. The process of claim 1, wherein the processor has an active surface including electrical connections suitable for mating with the detector.

7. The process of claim 1, wherein the processor includes electrical contacts adjacent the second insulator substrate.

8. The process of claim 1, wherein the display is grown so as to be from about 10 to about 30 microns thick.

9. The process of claim 1, wherein the display has an exposed side and a display elements side, wherein the exposed side is opposite the third insulator substrate and wherein the display elements side is proximate the third insulator substrate.

10. The process of claim 9, wherein the display elements include one or more of a metalization, a deposited light emitting diode, a mirror, and a dielectric material.

11. The process of claim 1, further including connecting the second stack to a power source.

12. The process of claim 11, wherein the connecting occurs at an edge of the second stack, an outside surface of the detector, or an outside surface of the display.

13. A stacked optical component manufactured by the process of claim 1.

14. An optical system for displaying light from a scene, comprising:

an active optical component including:
a first light directing device;
an optical detector;
a processor;
a display; and
a second light directing device,
wherein the first light directing device, the optical detector, the processor, the display, and the second light directing device are coupled together in a contiguous stack such that a user of the optical system views the scene through the contiguous stack.

15. An optical system according to claim 14, wherein the first light directing device includes a plurality of light directing apertures, and wherein adjacent ones of the light directing apertures are configured to provide redundant scene elements, and wherein the processor includes a program to use the redundant scene elements to adjust at least one from the group consisting of signal to noise ratio, contrast, and resolution.

16. An optical system according to claim 14, further comprising an external electronic device, wherein the external electronic device is connected for providing information, wherein the processor includes a program to overlay the information on the display on an image derived from the optical input.

17. An optical system according to claim 14, wherein the optical detector is sensitive in wavelengths including at least one from the group consisting of visible, near infrared, shortwave infrared, midwave infrared, longwave infrared, visible and near infrared, visible and shortwave infrared, near infrared and shortwave infrared, visible, near infrared and shortwave infrared, visible and midwave infrared, visible and longwave infrared, and visible, near infrared, shortwave infrared, midwave infrared, and longwave infrared.

18. An optical system according to claim 14, wherein the contiguous stack is partially formed from a process of:

growing epitaxially the optical detector onto a first insulator substrate;

growing epitaxially the processor onto a second insulator substrate;

growing epitaxially the display onto a third insulator substrate;

bonding the optical detector to the processor to form a first stack;

releasing the first stack from the second insulator substrate;

bonding the first stack to the display to form a second stack; and releasing the second stack from the first insulator substrate and the second insulator substrate.

19. An optical system according to claim 18, wherein the second light directing device includes a two-dimensional array of light directing apertures.

20. An optical system according to claim 14, wherein the second light directing device includes a two-dimensional array of light directing apertures.

* * * * *